United States Patent [19]

Taureg et al.

[11] Patent Number: 5,054,596

[45] Date of Patent: Oct. 8, 1991

[54] SPACING MEANS FOR SPACING PLATES IN A FLUID FRICTION COUPLING

[75] Inventors: Herbert Taureg, Hennef; Paul-Erich Schönenbrücher, Much-Kranüchel, both of Fed. Rep. of Germany

[73] Assignee: Viscodrive GmbH

[21] Appl. No.: 570,303

[22] Filed: Aug. 20, 1990

[30] Foreign Application Priority Data

Aug. 22, 1989 [DE] Fed. Rep. of Germany ....... 3927584

[51] Int. Cl.$^5$ ................. F16D 35/00; F16D 33/18
[52] U.S. Cl. ................... 192/58 B; 192/70.2
[58] Field of Search ........... 192/58 B, 58 C, 70.28, 192/70.16, 70.2; 464/24

[56] References Cited

U.S. PATENT DOCUMENTS

| | | | |
|---|---|---|---|
| 1,617,717 | 2/1927 | Lombard ................. | 192/70.2 X |
| 3,390,748 | 7/1968 | Hein et al. ............. | 192/58 B |
| 3,631,953 | 10/1970 | Snoy et al. ............. | 192/70.2 X |
| 3,994,378 | 11/1976 | Schwabe et al. ........ | 192/70.28 |
| 4,886,152 | 12/1989 | Teraoka ................. | 192/58 B |

FOREIGN PATENT DOCUMENTS

| | | | |
|---|---|---|---|
| 0230962 | 8/1987 | European Pat. Off. ......... | 192/58 B |
| 2149317 | 4/1973 | Fed. Rep. of Germany ..... | 192/70.2 |
| 2638902 | 10/1977 | Fed. Rep. of Germany ... | 192/70.28 |
| 614913 | 12/1948 | United Kingdom ........... | 192/70.28 |

Primary Examiner—Rodney H. Bonck
Attorney, Agent, or Firm—Toren, McGeady & Associates

[57] ABSTRACT

The invention relates to a fluid friction coupling in which the plates to be spaced are fixed via spacing strips which extend along the entire axial length of the package of plate to be spaced. This measure facilitates assembly and the plate package may be pre-assembled and spacer rings to be inserted separately are eliminated.

20 Claims, 8 Drawing Sheets

SPACING MEANS FOR SPACING PLATES IN A FLUID FRICTION COUPLING

BACKGROUND OF THE INVENTION

The invention relates to a fluid friction coupling having a coupling hub and a coupling housing rotatable on the coupling hub. Outer plates are arranged in the coupling housing and are non-rotatingly connected thereto via teeth, and inner plates are arranged on the coupling hub and are non-rotatingly connected thereto via teeth. The plates of one set of plates being are spaced via spacing means and the plates of the other set of plates are axially movable in the free spaces provided in this way.

With such fluid friction couplings, as known from DE 38 28 421 C, spacing is achieved by so-called spacer rings of a predetermined thickness. These spacer rings are slotted and as compared to the inner diameter of the coupling housing, they have a slightly increased outer diameter so that they rest against the inner housing wall in a prestressed condition. However, a disadvantage of this design is that automatic assembly of the plates is either not possible at all or causes great difficulties, which is the reason why the plates are fitted by hand. Such spacer rings have a further disadvantage in that producing such circular plates from steel wire is relatively complicated and expensive, and they are relatively heavy, as a result of which the weight of the finished fluid friction coupling is increased considerably. Furthermore, such spacer rings require a slightly larger outer diameter than the diameter of the coupling housing in order to ensure that they rest against the inner wall of the coupling housing in a prestressed condition so that they cannot slide into the region of rotation of the inner plates fitted between the outer plates.

From U.S. Pat. No. 3,058,027, it is known to arrange a certain number of teeth on the plates in an angular position in order to achieve a spring-loaded return. However, for spacing the plates, such an angular position is not suitable because the tolerances of the outer diameter and especially centering of the plates have to be very close to achieve uniform dimensions for the distances to be observed, whereas an articulated position, because of its spring-loaded return forces, does not permit such tolerances or only with considerable effort.

From DE 37 26 641 C1, it is known to provide one of the sets of plates with cam-like pressed-out regions which are aligned relative to each other in one direction of rotation and which increase the distance between the associated plates. However, it is the purpose of this design to provide the fluid friction coupling with different torque characteristics for the two directions of rotation. A predetermined distance between the plates cannot be achieved with such pressed-out regions.

SUMMARY OF THE INVENTION

It is an object of the present invention to provide a fluid friction coupling of the initially described type with spacing means which can be fitted easily and which, in the fitted condition, have a weight saving effect.

Pursuant to this object, and others which will become apparent hereafter, one aspect of the present invention resides in the spacing means being formed by axially extending spacing strips uniformly distributed on one of the toothed circumferences of the plates and having spacing tabs held between the plates associated with the teeth.

In this way it is possible to provide spacing means which permit assembly of a complete package of plates in one operation. The mass of the previously used rotating spacer rings is saved, and the weight of a plate package spaced in this way may be reduced considerably.

According to one embodiment of the invention, the spacing strips are received in the free spaces obtained by eliminating teeth of one of the sets of teeth.

In a preferred embodiment, the spacing tabs are formed onto the spacing strips so as to be integral with them. Furthermore, it is proposed that from the inner teeth of the coupling housing, teeth should be uniformly circumferentially eliminated for the purpose of accommodating the spacing strips.

To save further weight it is advantageous for the spacing strips to be made of temperature-resistant plastics, and especially it is proposed that the spacing strips should consist of temperature-resistant glass-fiber-reinforced plastics.

In a further advantageous embodiment, the spacing strips consist of metal, preferably aluminum or steel plate strips, with the plate metal strips being provided with curved regions, and the width of the curved regions corresponding to the distance required between two plates to be spaced. It is further proposed that, for spacing purposes, a plate metal strip should be uniformly inserted on the circumference of the outer plates and that the plate metal strips should comprise lateral channels for receiving the outer plates.

According to a further embodiment of the invention, channels are provided in some of the teeth uniformly distributed on the outer circumference of the outer plates, with spacing strips being inserted into the channels, and it is advantageous for wires to be inserted into the channels and to be connected to the respective outer plates in the assembly position or by seam welding.

An easy assembly and low weight are also provided if, for spacing the outer plates, there are provided plate metal strips which are uniformly distributed on their outer circumference and which are provided with apertures at predetermined distances, and if predetermined teeth of the outer plates pass through the apertures.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying

DETAILED DESCRIPTION OF PREFERRED EMBODIMENTS

Figure 1:
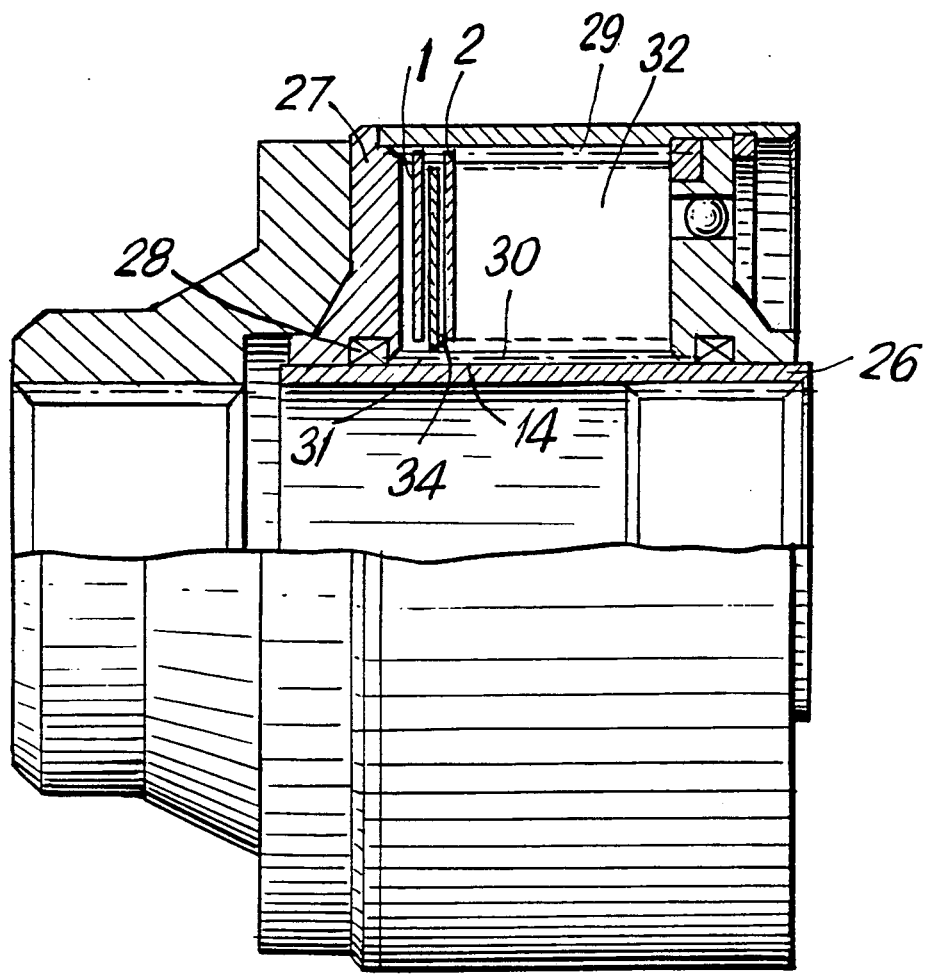
FIG. 1 is part of a longitudinal section through a fluid friction coupling in accordance with the invention.

The fluid friction coupling illustrated in FIG. 1 essentially consists of a coupling hub 26 on which a coupling housing 27 sealed by a seal 28 is arranged so as to be rotatable. The inner wall of the coupling housing 27 is provided with axially extending inner teeth 29 whereas the outer face of the coupling hub 26 is provided with corresponding outer teeth 30. Via teeth 34, inner plates 31 are non-rotatingly, but axially movably arranged on the outer teeth 30 of the coupling hub 26. Outer plates 1, axially spaced by spacing strips 3 in accordance with the invention, are non-rotatingly arranged in the inner teeth 29 of the coupling housing 27. The interior 32 of the coupling housing 27 is filled with a viscous fluid. The outer plates 1 are spaced by the spacing strips 3 in accordance with the invention and by forming free spaces 14, and the inner plates 31 are slightly axially movable in the free spaces 14.

Figure 2:
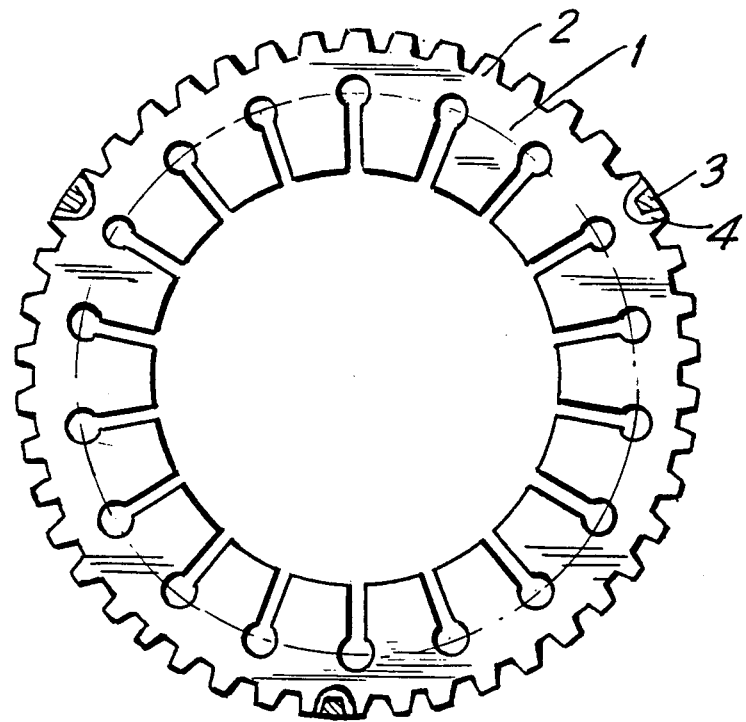
FIG. 2 is a plan view of an outer plate for being incorporated into a fluid friction coupling according to FIG. 1, also showing spacing strips.

An outer plate 1 illustrated by way of example in FIG. 2, on its circumference, comprises teeth 2 which may engage the inner teeth 29 in the coupling housing 27. Spacing strips 3 are inserted always between two teeth so as to be uniformly distributed on the circumference.

Figure 2A:
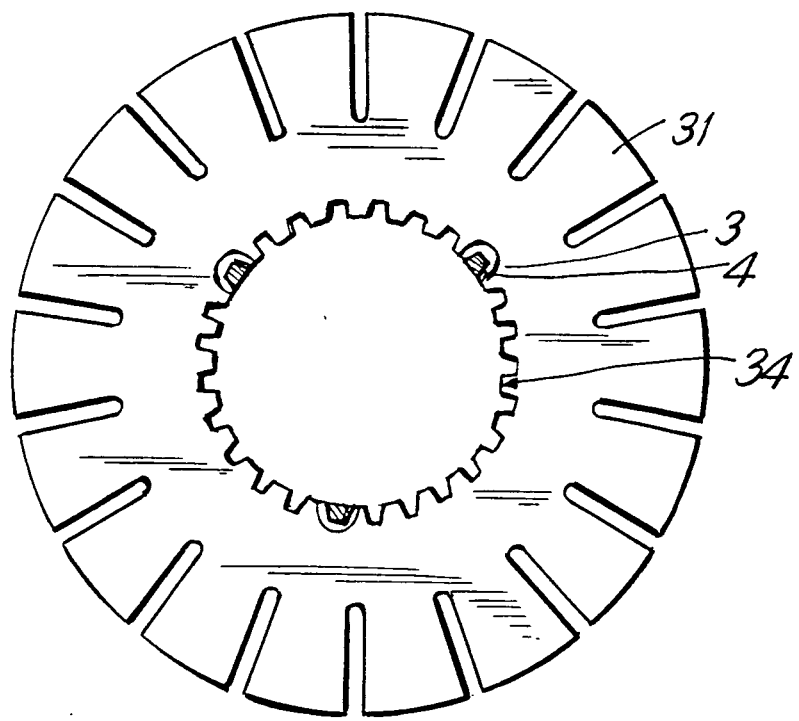
FIGS. 2a shows the arrangement of spacing strips with reference to an inner plate.

In the embodiment of FIG. 2a, the inner plates 31 are held on the coupling hub so as to be spaced, whereas the outer plates are movable.

Figure 3:
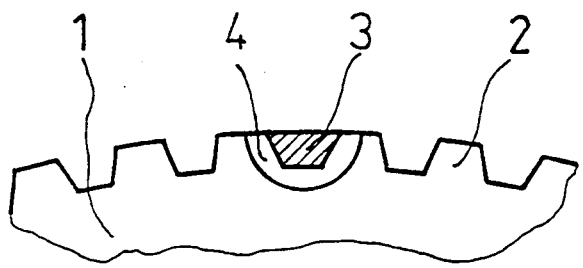
FIG. 3 shows the enlarged section from an outer plate according to FIG. 2, also illustrating a spacing strip.

FIG. 3 shows an enlargement of the spacing strip 3 with the carrier part 4 and the spacing tabs 5.

Figure 4:
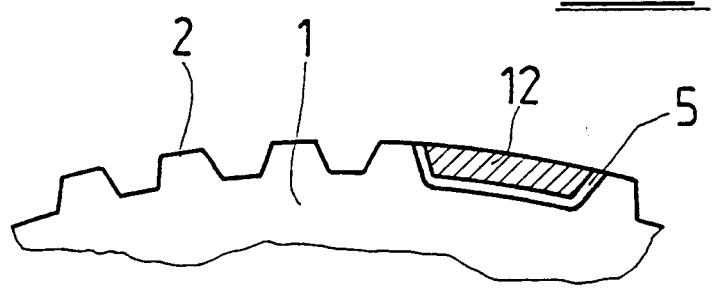
FIG. 4 shows the arrangement of a double spacing strip on an outer plate according to FIG. 2, extending over two teeth.

The diagrammatic view of the embodiment of FIG. 4 shows that in each case, a tooth of the set of teeth 2 of the plates 1 has been eliminated, with a double spacing strip 12 being inserted into the resulting free space 14 so as to extend axially.

Figure 5:
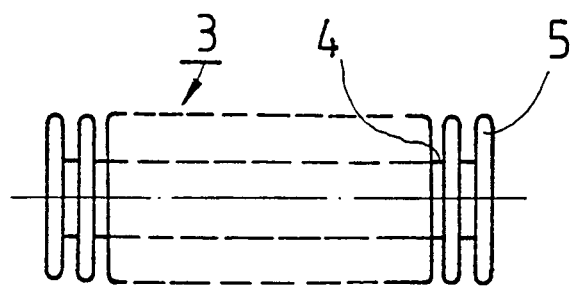
FIG. 5 is a plan view of a spacing strip for spacing outer plates according to FIG. 2.

FIG. 5 shows a plan view of a spacing strip 3 which, with an axially extending carrier part 4, may be inserted into the above-described free spaces 14 in the coupling housing 27 and in the outer plates and which comprises spacing tabs laterally pointing away from the carrier part 4. The width of the spacing tabs 5 corresponds to the free space 14 provided in each case between two outer plates 1.

Figure 6:
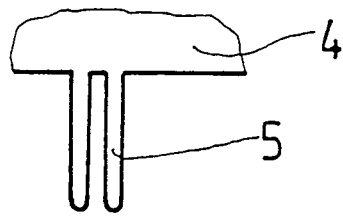
FIG. 6 shows in detail the design of a spacing tab of the spacing strip of FIG. 5.

As illustrated in FIG. 6, the ends of the spacing tabs 5 are preferably designed to be round to facilitate insertion into the plate package consisting of outer plates 1.

Figure 7:
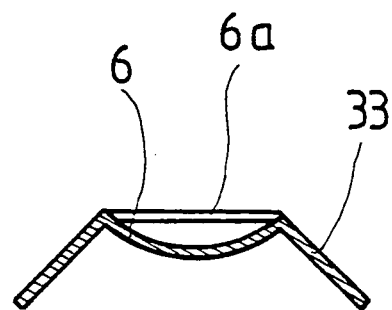
FIG. 7 is a section through a spacing strip produced from plate metal.
Figure 8:
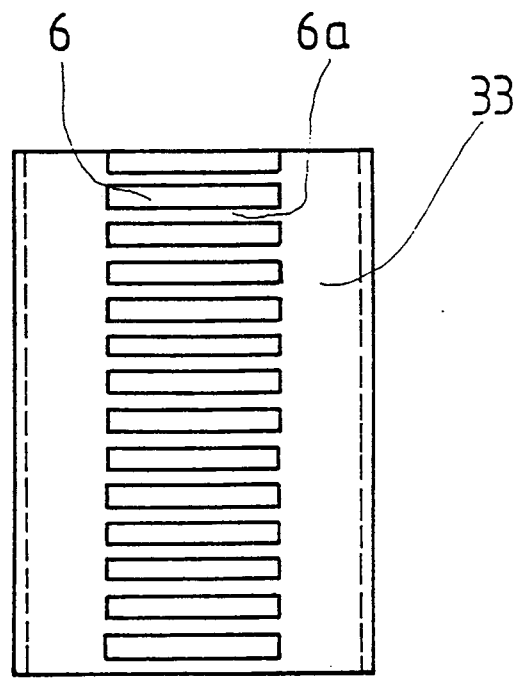
FIG. 8 is a plan view of a spacing strip according to FIG. 7, produced from plate metal.

For spacing the outer plates 1, FIGS. 7 and 8 show a plate metal strip 33 which is provided with a central, axially extending, radially inwardly pointing curved region 6. Webs 6a serve to space the outer plates 1 and extend between the curved regions 6.

Figure 9:
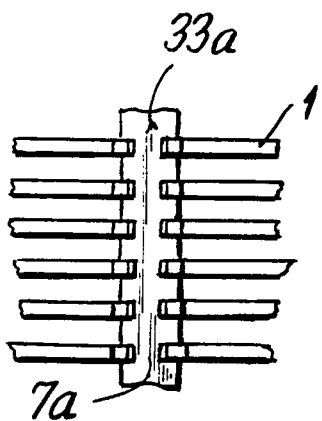
FIG. 9 is a plan view of a spacing strip produced from plate metal, having lateral channels.
Figure 10:
FIG. 10 is a plan view of the teeth of an outer plate, having a channel for receiving a spacing strip.
Figure 11:
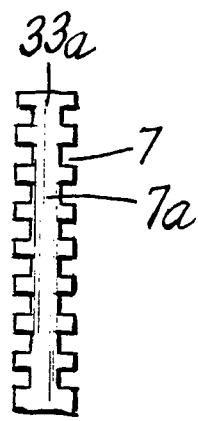
FIG. 11 is a plan view of a spacing strip produced from plate metal, having lateral channels.

FIGS. 9 and 11 show plate metal strips 33a which are provided for spacing purposes and which comprise lateral channels 7. In the plate metal strip 33a, these lateral channels 7 leave a closely axially extending web 7a which may be inserted into corresponding channels 8 of teeth 2 of the outer plates 1, as can be seen in FIG. 10.

Figure 12:
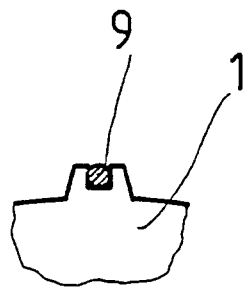
FIG. 12 shows the outer teeth of an outer plate according to FIG. 2, with a wire being inserted into a channel.
Figure 13:
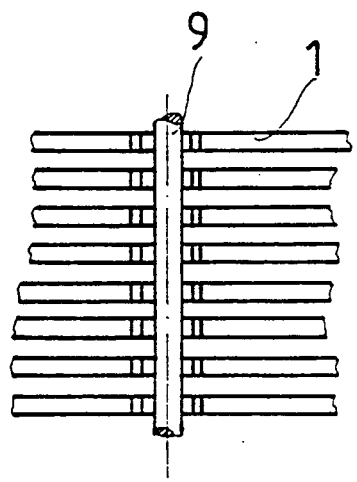
FIG. 13 is a plan view of a wire inserted as spacing strip into the channel of a tooth according to FIG. 12.
Figure 14:
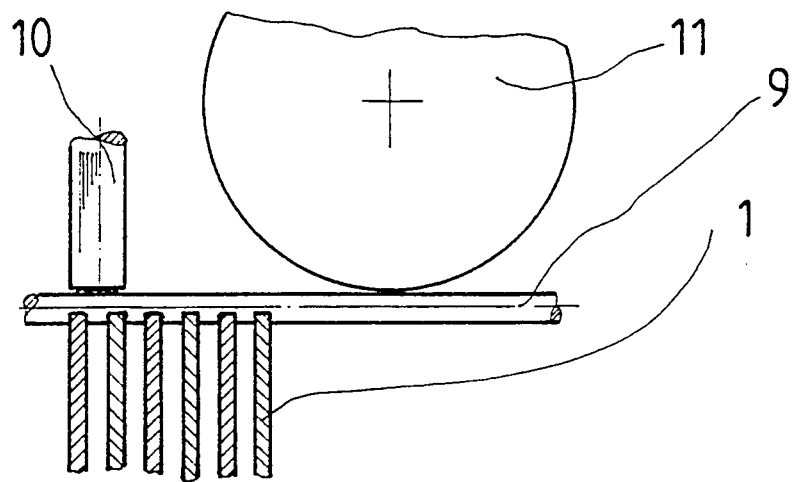
FIG. 14 illustrates the principle of spot welding for connecting a wire according to FIGS. 12 and 13 inserted into the channels of the teeth of the outer plate.

As shown in FIGS. 12 and 13, a channel 8 in the teeth 2 of an outer plate 1 may also be provided with an axially extending wire 9 which may be welded to the outer plates 1 at a predetermined distance by a spot or seam welding facility 10, 11 for example, as illustrated in FIG. 14.

For this purpose, the diagrammatically illustrated welding facility shown in FIG. 14 comprises a spot welding electrode 10 or it may be provided with a spot welding electrode 10 designed as a roller 11.

Figure 15:
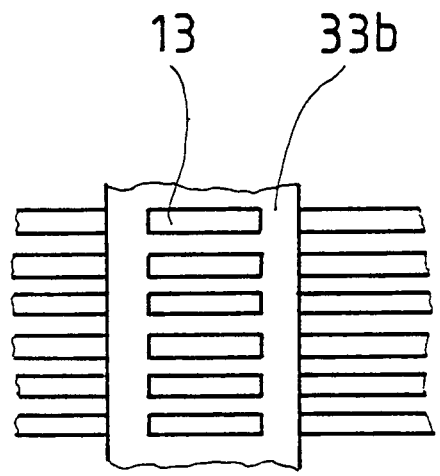
FIG. 15 is a plan view of a spacing strip provided with apertures for receiving a tooth of the outer plates.
Figure 16:
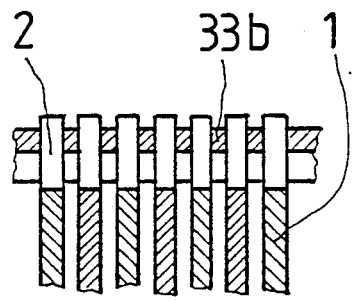
FIG. 16 is a longitudinal section through a spacing strip pursuant to FIG. 15, produced from plate metal.

In FIGS. 15 and 16, the spacing means take the form of a metal plate 33b provided with transversely extending apertures 13. As can be seen in FIG. 16, predetermined teeth of the set of teeth 2 of the outer plates 1 may be made to pass through these apertures 13 and twisted for fixing purposes, if required.

A fluid friction coupling provided with outer plates 1 spaced in this way may be used for example in the drive of a four wheel drive vehicle 15.

Figure 17:
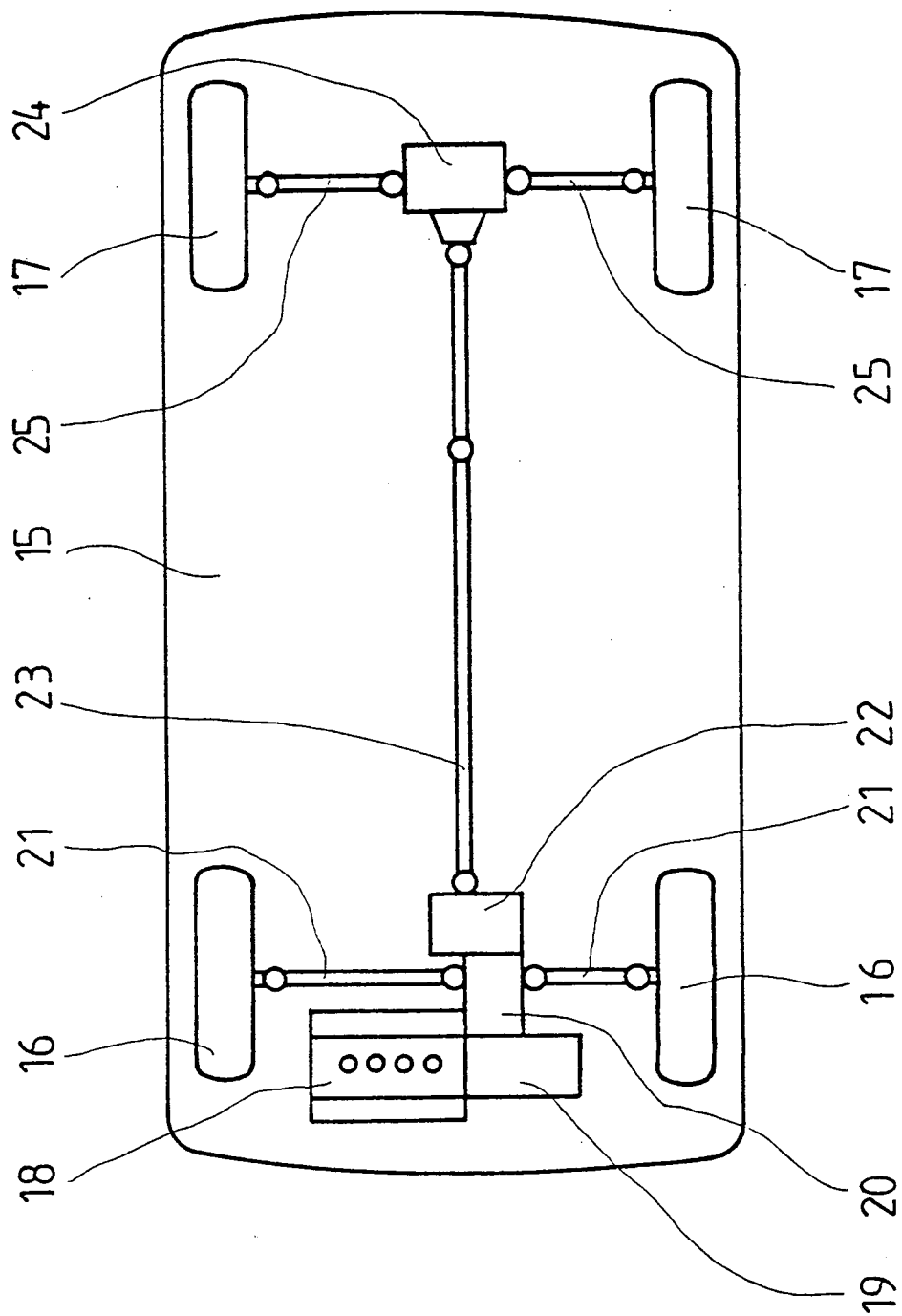
FIG. 17 shows the drive concept of a four wheel drive vehicle with a fluid friction coupling inserted into the driveline.

FIG. 17 shows the drive concept of a four wheel drive vehicle 15 having a fluid friction coupling incorporated into the driveline. The front wheels 16 of the vehicle 15 are driven by the engine 18, the gearbox 19 connected thereto, as well as by the differential 20 and the front side shafts 21. The drive for the rear wheels 17 may be branched off from the drive of the differential 20 for the front wheels 16, via the gearbox 19 and the propeller shaft 23. The propeller shaft 23 drives the rear wheels 17 via the rear axle differential 24 and the rear side shafts 25. The fluid friction coupling in accordance with the invention may be incorporated into the central differential 22 either for partially locking the differential movement of the front axle differential 20 and/or the rear axle differential 24 or for inhibiting the differential movement between the front wheels 16 and rear wheels 17.

While the invention has been illustrated and described as embodied in a spacing means for spacing plates in a fluid friction coupling, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims:

1. A fluid friction coupling, comprising: a coupling hub; a coupling housing rotatable on the coupling hub; an outer set of plates arranged in the coupling housing and non-rotatingly connected thereto via outer teeth; an inner set of plates arranged on the coupling hub and non-rotatingly connected thereto via inner teeth; and spacing means for spacing the plates of one set of plates, and the plates of the other set of plates being axially movable in free spaces provided in this way, the spacing means including axially extending spacing strips (3) uniformly distributed on one of the toothed circumferences of the plates (1 or 31) and having spacing tabs (5) held between the plates (1 or 31) associated with the teeth.

2. A fluid friction coupling according to claim 1, wherein the spacing strips (3) are received in further free spaces obtained by eliminating teeth from a set of teeth (2, 29( 30, 34).

3. A fluid friction coupling according to claim 2, wherein teeth are uniformly eliminated from inner teeth (29) of the coupling housing (27) so as to form the further free spaces for the purpose of receiving spacing strips (3).

4. A fluid friction coupling according to claim 2, wherein teeth are uniformly eliminated from the outer circumference of the outer plates (1) so as to form the further free spaces for the purpose of receiving spacing strips (3).

5. A fluid friction coupling according to claim 1, wherein the spacing tabs (5) are integral with the spacing strips (3).

6. A fluid friction coupling according to claim 1, wherein the spacing strips (3) are of temperature-resistant plastic.

7. A fluid friction coupling according to claim 1, wherein the spacing strips are of temperature-resistant glass-fiber-reinforced plastics.

8. A fluid friction coupling according to claim 1, wherein the spacing strips (3) are plate metal strips (33) which are provided with curved regions (6) corresponding to a distance required between two plates (1) to be spaced.

9. A fluid friction coupling according to claim 8, wherein the strips are one of aluminum and steel.

10. A fluid friction coupling according to claim 1, wherein plate metal strips are uniformly inserted on the circumference of the outer plates (1) so as to provide spacing, the plate metal strips (33a) having lateral channels (7) for receiving the outer plates (1).

11. A fluid friction coupling according to claim 1, wherein some of the teeth (2) uniformly distributed on the outer circumference of the outer plates (1) are provided with channels (8), and the spacing strips (3) are inserted into the channels (8).

12. A fluid friction coupling according to claim 1, wherein plate metal strips (33b) are provided to space the outer plates (1), the metal strips (33b) are uniformly distributed on the outer circumference of the outer plates (1) and are provided with apertures (13) at predetermined distances, so that predetermined teeth (2) of the outer plates (1) pass through the apertures (13).

13. A fluid friction coupling according to claim 12, wherein the teeth (2) of the outer plate (1) passing through the apertures are twisted.

14. A fluid friction coupling, comprising;
a coupling hub; a coupling housing rotatable on the coupling hub; an outer set of plates arranged in the coupling housing and non-rotatingly connected thereto via outer teeth; an inner set of plates arranged on the coupling hub and non-rotatingly connected thereto via inner teeth; and spacing means for spacing the plates of one set of plates, and the plates of the other set of plates being axially movable in free spaces provided by the spacing means, the spacing means including axially extending spacing strips (3, 9, 33b) uniformly distributed on one of the toothed circumferences of the plates (1 or 31) and including means for holding the spacing strips (3, 9, 33b) in contact with the plates (1 or 31) associated with the teeth.

15. A fluid friction coupling according to claim 14, wherein some of the teeth (2) uniformly distributed on the outer circumference of the outer plates (1) are provided with channels (8), the spacing strips being provided as wires (9) inserted into the channels and connected to respective outer plates (1) in an assembly position.

16. A fluid friction coupling according to claim 14, wherein some of the teeth (2) uniformly distributed on the outer circumference of the outer plates (1) are provided with channels (8), the spacing strips being provided as wires (9) inserted into the channels (8) and connected to respective outer plates by seam welding.

17. A fluid friction coupling according to claim 16, wherein the means for holding the spacing strips in contact with the plates includes spacing tabs held between the plates associated with the teeth.

18. A fluid friction coupling, comprising: a coupling hub; a coupling housing rotatable on the coupling hub; an outer set of plates arranged in the coupling housing and non-rotatingly connected thereto via outer teeth; an inner set of plates arranged on the coupling hub and non-rotatingly connected thereto via inner teeth; and spacing means for spacing the plates of one set of plates, and the plates of the other set of plates being axially movable in free spaces provided by the spacing means, the spacing means including axially extending spacing wires uniformly distributed on one of the toothed circumferences of the plates, some of the teeth (2) uniformly distributed on the outer circumference of the outer plates being provided with channels (8) into which the spacing wires (9) are inserted, the wires (9) being connected to respective outer plates in an assembly position.

19. A fluid friction coupling comprising; a coupling hub; a coupling housing rotatable on the coupling hub; an outer set of plates arranged in the coupling housing and non-rotatingly connected thereto via outer teeth; an inner set of plates arranged on the coupling hub and non-rotatingly connected thereto via inner teeth; and spacing means for spacing the plates of one set of plates, and the plates of the other set of plates being axially movable and free spaces provided by the spacing means, the spacing means including axially extending spacing wires (9) uniformly distributed on one of the toothed circumferences of the plates (1), some of the teeth (2) uniformly distributed on the outer circumference of the outer plates (1) being provided with channels, and the spacing wires being inserted into the channels and connected to respective outer plates (1) be seam welding.

20. A fluid friction coupling, comprising; a coupling hub; a coupling housing rotatable on the coupling hub; an outer set of plates arranged in the coupling housing and non-rotatingly connected thereto via outer teeth; an inner set of plates arranged on the coupling hub and non-rotatingly connected thereto via inner teeth; and spacing means for spacing the plates of one set of plates, and the plates of the other set of plates being axially movable and free spaces provided by the spacing means, the spacing means including axially extending spacing strips (3) uniformly distributed in one of the toothed circumferences of the plates (1 or 31) and having spacing (5) held between the plates (1 or 31) associated with the teeth, plate metal strips (33b) being provided so as to space the outer plates (1), the metal strips (33b) being uniformly distributed on the outer circumference of the outer plates (1) and provided with apertures (13) at predetermined distances so that predetermined teeth (2) of the outer plates (1) pass through the apertures (13).

* * * * *

UNITED STATES PATENT AND TRADEMARK OFFICE
CERTIFICATE OF CORRECTION

PATENT NO. : 5,054,596

DATED : October 8, 1991

INVENTOR(S) : Herbert Taureg et al

It is certified that error appears in the above-identified patent and that said Letters Patent is hereby corrected as shown below:

On the title page assignee should read --[73] Assignee: Viscodrive GmbH Federal Repulic of Germany--.

Signed and Sealed this

Sixteenth Day of March, 1993

Attest:

STEPHEN G. KUNIN

*Attesting Officer*     *Acting Commissioner of Patents and Trademarks*